(12) United States Patent
Nitta

(10) Patent No.: US 6,920,617 B2
(45) Date of Patent: Jul. 19, 2005

(54) SYSTEM AND METHODS FOR DISTRIBUTING DIGITAL CONTENT

(75) Inventor: Takashi Nitta, Chino (JP)

(73) Assignee: Seiko Epson Corporation, Tokyo (JP)

( * ) Notice: Subject to any disclaimer, the term of this patent is extended or adjusted under 35 U.S.C. 154(b) by 383 days.

(21) Appl. No.: 09/946,532

(22) Filed: Sep. 6, 2001

(65) Prior Publication Data

US 2002/0054035 A1 May 9, 2002

(30) Foreign Application Priority Data

Sep. 6, 2000 (JP) ........................................ 2000-270430
Jul. 4, 2001 (JP) ........................................ 2001-203811

(51) Int. Cl.[7] ................................................ G06F 3/00
(52) U.S. Cl. .................... 715/745; 715/747; 715/748; 715/789; 715/517; 715/522
(58) Field of Search ................................ 715/745, 744, 715/747, 748, 738, 760, 778, 762, 788, 789, 803, 800, 801, 517, 520, 521, 522, 524, 529, 513, 501.1; 345/745, 744, 747, 748, 738, 760, 778, 789, 803, 800, 801, 762, 788

(56) References Cited

U.S. PATENT DOCUMENTS

| | | | | |
|---|---|---|---|---|
| 5,339,392 A | * | 8/1994 | Risberg et al. | 345/762 |
| 5,937,418 A | * | 8/1999 | Ferris et al. | 715/513 |
| 5,983,227 A | * | 11/1999 | Nazem et al. | 715/517 X |
| 6,389,437 B2 | * | 5/2002 | Stoub | 345/760 X |
| 6,694,482 B1 | * | 2/2004 | Arellano et al. | 715/501.1 X |
| 2001/0054050 A1 | * | 12/2001 | Weil et al. | 707/517 |
| 2003/0097636 A1 | * | 5/2003 | Cleveland | 715/501.1 |
| 2003/0200507 A1 | * | 10/2003 | Stern et al. | 715/517 |

FOREIGN PATENT DOCUMENTS

| | | |
|---|---|---|
| JP | A-62-229364 | 10/1987 |
| JP | A-63-221457 | 9/1988 |
| JP | A-1-180062 | 7/1989 |
| JP | A-4-192751 | 7/1992 |
| JP | A-5-073542 | 3/1993 |
| JP | A-5-81247 | 4/1993 |
| JP | A-5-81253 | 4/1993 |
| JP | A-5-89102 | 4/1993 |
| JP | A-6-342428 | 12/1994 |
| JP | A-7-200701 | 8/1995 |
| JP | A-8-227416 | 9/1996 |
| JP | A-10-208071 | 8/1998 |

* cited by examiner

Primary Examiner—Raymond J. Bayerl
(74) Attorney, Agent, or Firm—Oliff & Berridge, PLC

(57) ABSTRACT

A digital content distribution system that is suitable for outputting digital content in a layout that is easy to view for a user is provided. The system can include a content distribution terminal that creates digital content by determining an output layout for the digital content, based on other-user-unique information and other-user-designated information in a user information record database, and distributes the created digital content based on a distribution address for the user information used for the creation. In the determination of the output layout, when the number of characters of character information forming one article in the digital content is greater than the number of storable characters in a character information frame, the part of the character information which is greater than the number of the storable characters is stored in another character information frame, and guidance information for referring to the excess part is stored in the character information frame in which the part of the character information which is less than the number of the storable characters is stored.

2 Claims, 11 Drawing Sheets

300 USER PROFILE TABLE

| USER ID | DISTRIBUTION ADDRESS | CATEGORY No. | KEYWORD | DATE OF DISTRIBUTION | TIME OF DISTRIBUTION | LAYOUT No. | MAXIMUM NUMBER OF PAGES | FONT SIZE |
|---|---|---|---|---|---|---|---|---|
| Andy | Andy@aaa.com | 1700 | PROCESSOR | EVERYDAY | 5 | 2 | 2 | SMALL |
| Bill | Bill@bbb.com | 1501 | OS | WEEKDAY | 11 | 5 | 2 | SMALL |
| Candy | Candy@ccc.com | 201* | APPLICATION | WEEKEND | 9 | 6 | u | REGULAR |

302 304 306 308 310 312 314 316 318

| OTHER-USER-UNIQUE INFORMATION | OTHER-USER-DESIGNATED INFORMATION | | |
|---|---|---|---|
| | | | |
| | | | |
| | | | |

Step1
DESIGNATE CATEGORY

| First Choice ▼ (320) | Second Choice ▼ (321) | Third Choice ▼ (322) |
| Fourth Choice ▼ (323) | Fifth Choice ▼ (324) | Sixth Choice ▼ (325) |

326 — DETERMINE

FIG. 8

Step2
INPUT USER ID, ETC.

DISTRIBUTION ADDRESS
330 — [ ]

USER ID
331 — [ ]

PASSWORD
332 — [ ]

DATE OF DISTRIBUTION
340 — ○ EVERYDAY
341 — ○ EVERY WEEK
342 — ○ WEEKDAY (MONDAY THROUGH FRIDAY)
343 — ○ WEEKEND (SATURDAY / SUNDAY)

TIME OF DISTRIBUTION
350 — [Select Timezone ▼]
351 — [Select Time of Day ▼]

352 — DETERMINE

FIG. 9

CATEGORY  EDIT

First Choice
      SPORTS; GOLF; MARUYAMA

Second Choice
      AMERICA; AMERICA TOP NEWS; BUSH

DATE AND TIME OF DISTRIBUTION  EDIT
   EVERYDAY
   5:00 AM

DISTRIBUTION ADDRESS
   Tanaka. Toshio3@exc.aaaa.co.jp

DESIGN TYPE  EDIT

MAXIMUM NUMBER OF PAGES
   4 PAGES

FONT SIZE
   SMALL

390 — START DISTRIBUTION

SYSTEM AND METHODS FOR DISTRIBUTING DIGITAL CONTENT

BACKGROUND OF INVENTION

1. Field of Invention

The present invention relates to a system for distributing digital content. In particular, the invention relates to a viewable information creating system, a digital content creating system, and a digital content creating program which are suitable for outputting digital content in a layout that is easily viewable for a user.

2. Description of Related Art

Conventionally, systems for providing digital content, such as news, include, for example, a personal electronic newspaper system (hereinafter referred to as a first conventional example) as disclosed in Japanese Unexamined Patent Application Publication No. 4-192751. Current technology also includes, for example, a mail-order-sale-catalog creating system (hereinafter referred to as a second conventional example) disclosed in Japanese Unexamined Patent Application Publication No. 7-200701.

The first conventional example includes, an electronic newspaper system in which article information transmitted from an article information database (the database is hereinafter abbreviated to simply the DB) containing article information on newspaper articles is received, and is displayed on a screen in a reproduced form, an information storage unit in which interest and knowledge of a plurality of users are stored as space forming information for a plurality of individuals and a learning unit which learns individual-oriented space-forming information from a record of retrieval made by users. The first example can further include a screen operation unit by which, by operating the screen, from the article information DB, article information for each user is acquired based on the individual-oriented space-forming information, and is displayed in a reproduced form, and a control unit for controlling the information storage unit, the learning unit, and the screen operation unit.

Accordingly, this makes it possible to easily obtain article information matching interest and knowledge that each user has, and more detailed article information can be provided.

In the second conventional example, a goods information file containing goods information (photographed images and explanations of goods) to be listed in catalogs about types of goods, a customer information file containing personal information on specified attributes of individuals, and a goods condition file in which conditions matching the attributes of the personal information can be set for the types of goods that are provided. By using a listed goods extracting unit, the personal information in the customer information file and conditions in the goods information file can be compared, and only a type of goods which matches the conditions for each customer is extracted. A layout processing unit reads and lays out goods information on the extracted goods. After the goods information which is laid out is output from a color electronic printer onto paper, the paper is processed in the form of a booklet by a bookbinding machine, and is sent to the customer.

Accordingly, this makes it possible to create a customer-unique catalog that contains only goods adapted for each customer.

Document layout technologies can include, for example, a document processing apparatus disclosed in Japanese Unexamined Patent Application Publication No. 62-229364, a document layout method disclosed in Japanese Unexamined Patent Application Publication No. 05-073542, a document layout method disclosed in Japanese Unexamined Patent Application Publication No. 05-081253, a document output method disclosed in Japanese Unexamined Patent Application Publication No. 05-089102, a document layout method disclosed in Japanese Unexamined Patent Application Publication No. 06-342428, and a document processing apparatus disclosed in Japanese Unexamined Patent Application Publication No. 08-227416 (these are hereinafter referred to as third conventional examples). Also, a document shaping apparatus disclosed in Japanese Unexamined Patent Application Publication No. 63-221457, and a document shaping method disclosed in Japanese Unexamined Patent Application Publication No. 05-081247 (these are hereinafter referred to as fourth conventional examples) are included. Moreover, a document shaping apparatus disclosed in Japanese Unexamined Patent Application Publication No. 01-180062 (hereinafter referred to as a fifth conventional example), a variable print system disclosed in Japanese Unexamined Patent Application Publication No. 10-208071 (hereinafter referred to as a sixth conventional example), and an individual-oriented electronic newspaper system disclosed in Japanese Unexamined Patent Application Publication No. 04-192751 (hereinafter referred to as a seventh conventional example) are included.

SUMMARY OF THE INVENTION

In many cases, to date, most information that is distributed by a digital content distribution system is character information, as in article information distributed in the form of electronic mail. This is because there are circumstances in which a large amount of data cannot be transmitted within an effective time due to reasons, such as low transmission speed of a network. Accordingly, in many cases, it is not necessary to particularly consider the layout of distributed article information since it is satisfactory that the article information can be read on a screen, so that the article information does not need to be particularly printed, and if the article information is printed, it is satisfactory that character information can be read.

However, recently the transmission speed of the network is increasing, the distribution of not only character information but also image information will be possible in future. This can have a drawback in that the entirety of article information cannot be grasped by performing reading on the screen. Thus, it is expected that many users will want to print distributed article information and read them on paper.

Nevertheless, according to the first conventional example, it is possible that a WWW (World Wide Web) browser, or the like, can be used to actually read the article information. When using the WWW browser, printing of article information displayed on a screen may cause a case in which a piece of the article information cannot be accommodated on a sheet of paper and is printed on a plurality of sheets of paper, so that the printing result may become illegible. In particular, in a case in which images and character information are integrated into a piece of article information, it is possible that the images be printed on a sheet of paper separately from a sheet on which the character information is printed. In this case, it is difficult for a user to understand how the character information and the images correspond to each other, so that the content of each piece of the article information may not be grasped, as well as the article information cannot be grasped as a whole.

In a case in which the second conventional example is applied to a digital content distribution system, it may be said that the above problems can be solved to some extent in that the article information on the extracted goods is read and laid out. However, the layout of the output catalog is determined by the distributor of the catalog, and the catalog is printed in a predetermined layout that can be easily read by the user. Thus, the catalog can be easily read on average, but cannot always be easily read by all users. Specifically, because of the subjective nature, there may be a case in which a larger font of the character information makes readability better for one user, and conversely there may be the case in which another user feels readability is better when the printed catalog has a smaller area for arranging the character information and a larger area for arranging the images.

Any of the third conventional examples has a layout based on headings. Thus, in addition to a low degree of freedom in the layout, the output layout does not have any item that can be designated by a user, and information unique to the user cannot be considered, so that the layout is not always easily viewed by all users.

In any of the fourth examples, a layout is performed so that, within the number of pages which is designated by a user, a document can be accommodated only by adjusting character spacing and line pitch. Thus, there are not only a case in which the layout may not look neat, but also a case in which the number of pages is only a user-designatable item concerning the output layout and information unique to the user is not considered. Therefore, the layout is not always easily viewed by all users.

In the fifth conventional example, a user-designatable item concerning the output layout is only a keyword that can be included in document structure itself or in the document, and user-unique information is not considered. Thus, the output layout is not always viewed by all users.

In the sixth conventional example, although the output result changes based on user information, content to be accommodated in the frame of character information changes, but the output layout does not change, and user-unique information is not considered. Thus, the output layout is not always easily viewed by all users.

In the seventh conventional example, which of articles should be employed is determined based on the importance of the articles, but there is no user-designatable item concerning the output layout, and user-unique information is not considered. Thus, the output layout is not always easily viewed by all users.

Accordingly, the present invention is made as a result of paying attention to the unsolved problems that the related art has, and an object of the invention is to provide a viewable information creating system, a digital content creating system, a digital content distribution system, and a digital content creating program that are suitable for outputting digital content in a user-legible layout.

In accordance with the present invention, a digital content distribution system that is suitable for outputting digital content in a layout that is easy to view for a user is provided. The system can include a content distribution terminal that creates digital content by determining an output layout for the digital content, based on other-user-unique information and other-user-designated information in a user information record database, and distributes the created digital content based on a distribution address for the user information used for the creation. In the determination of the output layout, when the number of characters of character information forming one article in the digital content is greater than the number of storable characters in a character information frame, the part of the character information which is greater than the number of the storable characters is stored in another character information frame, and guidance information for referring to the excess part is stored in the character information frame in which the part of the character information which is less than the number of the storable characters is stored.

BRIEF DESCRIPTION OF THE DRAWINGS

The invention will be described with reference to the accompanying drawings, in which like elements are referred to with like numbers, and in which:

FIG. 3 is a table showing the data structure of a user profile table 300;

FIG. 8 is a drawing showing a category designation screen;

FIG. 9 is a drawing showing a screen for inputting a user ID, etc;

DETAILED DESCRIPTION OF PREFERRED EMBODIMENTS

Figure 1:
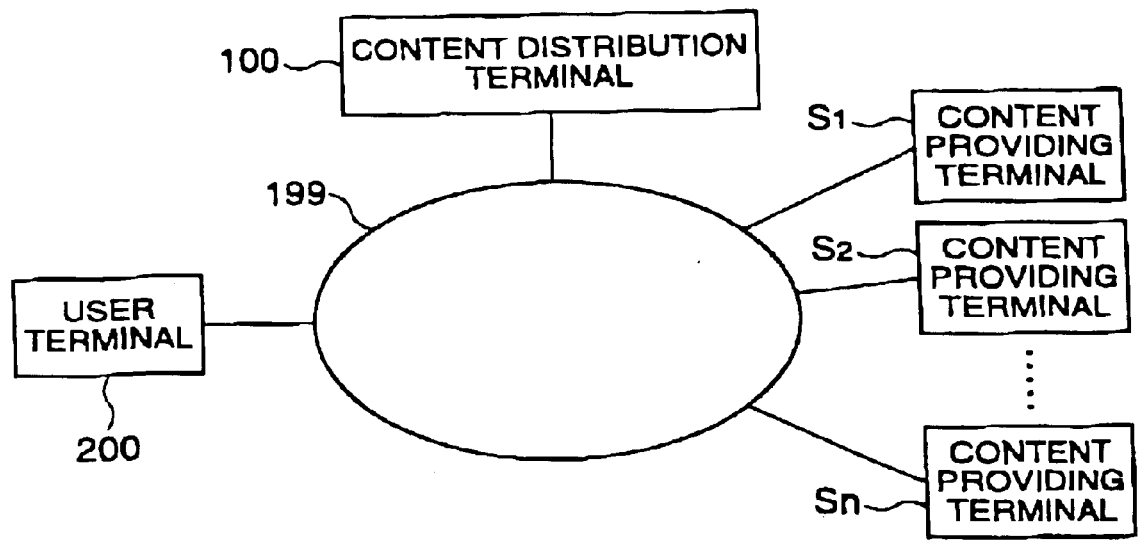
FIG. 1 is a block diagram showing a network system to which the present invention is applied.

To achieve the above object, a viewable information creating system of the present invention can be a system which creates viewable information capable of being viewed. The system can include a user information storage device that stores user information on each user, in which the viewable information is created by determining, based on the user information in the user information storage device, an output layout for the viewable information.

In this construction, based on the user information in the user information storage device, the output layout for the viewable information is determined and the viewable information is created.

This makes it possible to output viewable information in an output layout that relatively matches with user's desire since user-unique information and user-designated information are considered concerning the output layout. Thus, viewable information can be output in an output layout that is more easily viewable for the user than conventional.

Here, the user information can include, for example, the age, sex, interest/preference, address, and name of the user, user-terminal-related operating environments, and the like. Based on the user information, the output layout can be determined. When the user information includes age, and the user is a relatively elder person, a layout having a relatively large font can be employed. When the user information includes sex, and the user is female, a layout having a round character font can be employed. When the user information includes interest/preference, a layout looking a magazine for children, a sport paper, or a technical document in accordance with the interest/preference can be employed. When the user information includes an address, a layout can be employed in which the image of a landscape correlated with a place having the address is used as a background. When the user information includes a name, a layout having the name as a title can be employed. When the user information includes user-terminal-related operating environments, and the RAM of the user terminal has a less capacity, a layout in which an image having a large amount of data is not used as much as possible can be employed.

This system may be implemented as a single apparatus, or may be implemented as a network system in which a plurality of terminals are connected so that they can communicate mutually. In the former case, the user information is input to the single apparatus by the user or a system manager. In the latter case, the user information is input, for example, such that the user uses a client terminal to access a server terminal that performs recording according to the present invention.

The user information storage device stores the user information by every possible means anytime, and may be one that stores the user information beforehand, or one that is controlled by an external input or the like in accordance with the activation of this system to store the user information without storing the user information beforehand.

The output layout can include a display layout for displaying viewable information on a screen, or a print layout for printing viewable information on paper.

To achieve the above object, the digital content creating system is a system which creates digital content. The system can include a user information storage device that stores user information on each user and a content creating device that creates a digital content by determining, based on the user information in the user information storage device, an output layout for the digital content.

In this construction, the content creating device can determine, based on the user information in the user information storage means, the output layout for the digital content, and creates the digital content.

This makes it possible to output digital content in an output layout that relatively matches with user's desire since user-unique information and user-designated information are considered concerning the output layout. Thus, digital content can be output in an output layout that is more easily viewable for the user than conventional.

Here, the output layout can include a display layout for displaying the digital content, or a print layout for printing the digital content on paper.

In the digital content creating system of the present invention, the content creating device can create the digital content by disposing, in an output area, a character information frame for storing character information, and storing, in the character information frame, character information included in the digital content. When the number of characters of character information forming one document in the digital content is more than the number of storable characters in the character information frame, the content creating device stores, in another character information frame, excess part of the character information which is more than the storable characters, and stores, in the character information frame in which part of the character information which is less than the storable characters is stored, guidance information for referring to the excess part.

In this construction, by using the content creating device, the character information frame is disposed in the output area, and character information included in the digital content is stored in the character information frame. When the number of characters of character information forming one article in the digital content is more than the number of storable characters in the character information frame, part of the character information which is more than the storable characters is stored in another character information frame, and guidance information for referring to the excess part is stored in the character information frame in which part of the character information which is less than the storable characters is stored.

This enables a relatively easily viewable output layout because character spacing and character pitch are not changed, even when the number of characters of character information forming one document (for example, one article) in the digital content is more than the number of storable characters in the character information frame. By referring to the guidance information, the user can understand how the character information corresponds.

In the digital content creating system of the present invention, the content creating device can create the digital content by disposing, in an output area, a character information frame for storing character information, and storing, in the character information frame, character information included in the digital content. When the number of characters of character information forming one article in the digital content is more than the number of storable characters in the character information frame, the content creating device deletes excess part of the character information which is more than the storable characters, and stores, in the character information frame in which part of the character information which is less than the storable characters is stored, guidance information indicating that the excess part has been deleted.

In this construction, by using the content creating device, the character information frame is disposed in the output area, and character information included in the digital content is stored in the character information frame. When the number of characters of character information forming one article in the digital content is more than the number of storable characters in the character information frame, part of the character information which is more than the storable characters is deleted, and guidance information indicating that the excess part has been deleted is stored in the character information frame in which part of the character information which is less than the storable characters is stored.

This enables a relatively easily viewable output layout because character spacing and character pitch are not changed, even when the number of characters of character information forming one document (for example, one article) in the digital content is more than the number of storable characters in the character information frame. By referring to the guidance information, the user can view the deleted part of the character information.

In the digital content creating system of the present invention can further include an abbreviation storage device in which each abbreviation obtained by omitting part of a word form is stored so as to be correlated with a word or sentence including the word form. The system can further include that the content creating device create the digital content by disposing, in an output area, a character information frame for storing character information, and storing, in the character information frame, character information included in the digital content. When the number of characters of character information forming one document in the digital content is more than the number of storable characters in the character information frame, the content creating device converts each word or sentence which is included in the character information into an abbreviation by referring to the abbreviation storage device, and stores, in the character information frame, the character information obtained after the conversion.

In this construction, by using the content creating device, the character information frame is disposed in the output area, and character information included in the digital content is stored in the character information frame. When the number of characters of character information forming one document in the digital content is more than the number of storable characters in the character information frame, a word or a sentence which is included in character information can be converted into an abbreviation by referring to the abbreviation storage device, and the character information obtained after the conversion is stored in the character information frame.

This enables a relatively easily viewable output layout because character spacing and character pitch are not changed, even when the number of characters of character information forming one document (for example, one article) in the digital content is more than the number of storable characters in the character information frame.

In the digital content creating system of the present invention, the content creating device creates the digital content by arranging, in an output area, images which are included in a character information frame for storing character information and in the digital content so that the images cannot overlap mutually, and storing, in the character information frame, the character information which is included in the digital content. When the number of characters of character information forming one document in the digital content is more than the number of storable characters in the character information frame, the content creating device expands the area of the character information frame beyond a range in which the character information frame does not overlap with the images so that the character information can be stored in the character information frame.

In this construction, by using the content creating device, images which are included in a character information frame for storing character information and in the digital content are arranged in the output area so that the images cannot overlap mutually. When the number of characters of character information forming one document in the digital content is more than the number of storable characters in the character information frame, the area of the character information frame is expanded beyond a range in which the character information frame does not overlap with the images so that the character information can be stored in the character information frame.

This enables a relatively easily viewable output layout because character spacing and character pitch are not changed, even when the number of characters of character information forming one document (for example, one article) in the digital content is more than the number of storable characters in the character information frame.

A digital content creating system of the present invention, when the character information frame overlaps with the image as a result of the expansion of the character information frame, the content creating device determines, based on the color of the overlapping part of the images, the color of characters in the overlapping part of the character information frame.

In this construction, by the content creating device, when the character information frame overlaps with the image as a result of the expansion of the character information frame, the color of characters in the overlapping part of the character information frame is determined based on the color of the overlapping part of the images.

This makes it possible to set the characters of the overlapping part to be such recognizable that, for example, if the color of the overlapping part of the image is black, the overlapping part of the character information frame is set white, even when the character information frame overlaps with the images.

In this construction, the processes of the content creating device can be selectively executed by the user. For example, when the user desires to delete part that cannot be stored in the character information frame, the user may select a process by the content creating device.

This makes it possible to output digital content in an output layout which relatively matches user's desire. Thus, digital content can be output in an easily viewable output layout for the user.

In a digital content creating system of the present invention, the content creating device creates the digital content by disposing, in an output area, a character information frame for storing character information, and storing, in the character information frame, character information included in the digital content. When the number of characters of character information forming one document in the digital content is more than the number of storable characters in the character information frame, the content creating device reduces the character information frame, and arranges other digital content, an advertisement, and other information in a free area of the output area which is formed by the reduction.

In this construction, by using the content creating device, the character information frame is disposed in the output area, and character information included in the digital content is stored in the character information frame. When the number of characters of character information forming one document in the digital content is less than the number of storable characters in the character information frame, the character information frame is reduced, and other digital content, an advertisement, and other information are arranged in a free area of the output area which is formed by the reduction.

This enables a relatively easily viewable output layout because character spacing and character pitch are not changed even when the number of characters of character information forming one document (for example, one article) in the digital content is more than the number of storable characters in the character information frame. Since other digital content, an advertisement, and other information are arranged in a free area of the output area which is formed by the reduction, the digital content cannot be emptied.

In a digital content creating system of the present invention, based on the number of images included in the digital content or the amount of character information included in the digital content, the output layout for the digital content can be determined by the content creating device.

In this construction, by using the content creating device, based on the number of images included in the digital content or the amount of character information included in the digital content, the output layout for the digital content can be determined.

This enables a relatively easily viewable output layout, even if the number of images included in the digital content or the amount of character information included in the digital content is large, or is conversely small.

In a digital content creating system of the present invention, based on the aspect ratio of an image included in the digital content, the output layout for the digital content is determined by the content creating device. In this construction, by using the content creating device, based on the aspect ratio of an image included in the digital content, the output layout for the digital content is determined.

This enables a relatively easily viewable output layout, even if the aspect ratio of the image included in the digital content is large, or is conversely small. For example, the longitudinal length of an image is larger than the lateral length of the image, an A-4 size sheet of paper is longitudinally positioned for arranging characters and images. Conversely, when the lateral length of the image is larger than the longitudinal length of the image, the A-4 size sheet of paper is laterally positioned for arranging characters and images.

In a digital content creating system of the present invention, the user information includes content information the distribution of which is desired by the user, and based on the content information in the user information storage device, the output layout for the digital content is determined by the content creating device. In this construction, by the content creating device, based on the content information in the user information storage means, the output layout for the digital content is determined. This enables a relatively easily viewable output layout because a layout is formed so that digital content that the user desires the distribution thereof is, for example, emphasized.

In addition, to achieve the above object, the digital content creating system content creating system, wherein, the user information includes an address to which the digital content is distributed, and the digital content distribution system comprises content distribution device for, based on the address for the user information which is used for the creation by the content creating device, distributing the digital content created by the content creating device.

In this construction, by using the content creating device, based on the user information in the user information storage device, the output layout for the digital content is determined and the digital content is created, and the content distribution device distributes the created digital content based on the distribution address of the user information.

This makes it possible to output digital content in an output layout that relatively matches with user's desire since user-unique information and user-designated information are considered concerning the output layout. Thus, digital content can be output in an output layout that is more easily viewable for the user than conventional.

In addition to achieve the above object, the digital content creating system is a digital content creating program for creating digital content, in which the digital content creating program controls a computer which can include a user information storage device for storing user information on each user to execute processing implemented as a content creating device which creates digital content by determining, based on the user information in the user information storage device, an output layout for the digital content.

In this construction, when the program is read by the computer, and the computer executes the processing in accordance with the read program, operation equivalent to that of the above described digital content creating system can be obtained.

In the foregoing the viewable information creating system, the digital content creating system, the digital content distribution system, and the digital content creating program for achieving the above object have been proposed. However, not only these but also the following storage medium can be proposed in order to achieve the above object.

The storage medium is a storage medium which contains a content creating program for creating digital content and which is a computer-readable storage medium containing a program for controlling a computer which includes a user information storage device for storing user information on each user to execute processing implemented as content creating device which creates the digital content by determining, based on the user information in the user information storage medium, an output layout for the digital content.

In this construction, when the content creating program stored in the storage medium is read by the computer, and the computer performs execution in accordance with the read program, operation equivalent to that of the above described digital content creating system can be obtained.

A first embodiment of the present invention is described below with reference to the drawings. FIG. 1 to FIG. 11 are drawings showing the first embodiment concerning a viewable information creating system, a digital content creating system, a digital content distribution system, and a digital content creating program which are in accordance with the present invention.

In the embodiment, the viewable information creating system, the digital content creating system, the digital content distribution system, and the digital content creating program which are in accordance with the present invention are applied to a case in which a content distribution terminal 100 distributes digital content, such as news, to a user terminal 200, as shown in FIG. 1.

First, the structure of a network system to which the present invention is applied is described with reference to FIG. 1. FIG. 1 is an exemplary block diagram showing the structure of the network system to which the present invention is applied.

As FIG. 1 shows, a plurality of content providing terminals $S_l$ to $S_n$ that provide digital content, the content distribution terminal 100, in which the digital content provided by the content providing terminals $S_l$ to $S_n$ is collected and stored and is distributed, and the user terminal 200 are connected to the Internet 199. Although only one user terminal 200 is shown for facilitating the understanding of the present invention, a plurality of user terminals are actually connected to the Internet 199.

The content providing terminals $S_l$ to $S_n$ each have functions identical to those of a general computer in which a CPU, a ROM, a RAM, an I/F (interface), etc., are connected by a bus. When each of the terminals creates digital content, it can transmit the digital content to the content distribution terminal 100 after adding a category No. (number) for specifying the category of the digital content to the digital content. The category No. is described in greater detail below.

The user terminal 200 has functions identical to those of a general computer in which a CPU, a ROM, a RAM, an I/F, etc., are connected by a bus, and has a WWW browser that is used to access the content distribution terminal 100.

Figure 2:
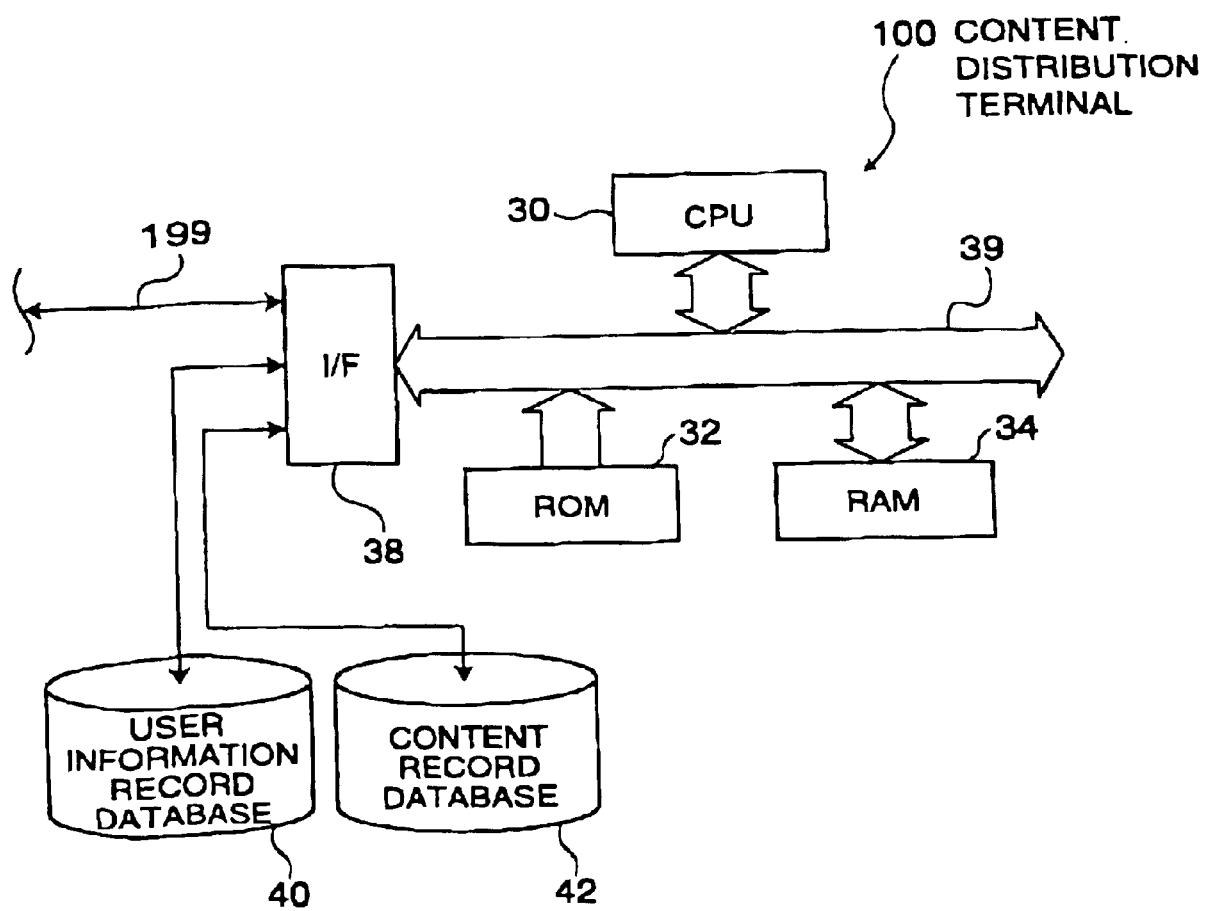
FIG. 2 is a block diagram showing the structure of a content distribution system 100.

Next, the structure of the content distribution terminal 100 is described with reference to FIG. 2. FIG. 2 is an exemplary block diagram showing the structure of the content distribution terminal 100.

The content distribution terminal 100 can include, as shown in FIG. 2, a CPU 30 that controls, based on a control program, operations and the entire system, a ROM 32 in which the control program of the CPU 30, etc., are stored in a predetermined area, a RAM 34 for storing data which is read from the ROM 32 and the arithmetic results required for the process of arithmetic operation by the CPU 30, and an I/F 38 through which data is input/output from/to an external unit. These are connected by a bus 39 as a signal line for transferring data so that data can be sent and received.

A user information record DB (database) 40 that records user information, a content record DB 42 in which the digital content provided by the content providing terminals $S_l$ to $S_n$ is collected and stored, and a signal line for connecting to the Internet 199 are connected as external units to the I/F 38.

The user information record DB 40 contains a user profile table 300 for recording the user information as shown in FIG. 3. FIG. 3 is a table showing the data structure of a user profile table 300.

In the user profile table 300, one or a plurality of records can be recorded for each user, as shown in FIG. 3. Each record includes a field 302 for recording a user ID for specifying a user, a field 304 for recording a distribution address of digital content, a field 306 for recording a category No., a field 308 for recording a keyword, a field 310 for recording a date of distribution, a field 312 for recording a time of distribution, a field 314 for recording a layout No., a field 316 for recording a maximum number of pages, a field 318 for recording font size, a field 320 for recording other-user-unique information, and a field 322 for recording other-user-designated information.

When digital content including a keyword designated by the user is selected as a thing to be distributed, the keyword is recorded in the field 308. Regarding the keyword, for example, a keyword that seems to appear frequently in an article in which the user is interested is given. In the example in FIG. 3, "processor" is recorded in the first row in the field 308 and "OS" (Operating System)" is recorded in the second row in the field 308.

In the field 310, a date of distribution on which the user desires the distribution of digital content is recorded. Regarding the date of distribution, when the everyday distribution of digital content is desired, "EVERYDAY" is designated, when the distribution only on a weekday is desired, "WEEKDAY" is designated, and when the distribution only on a weekend is desired, "WEEKEND" is designated. In the example in FIG. 3, "EVERYDAY" is recorded in the first row in the field 310, and "WEEKDAY" is recorded in the second row in the field 310.

In the field 312, a time of distribution which is desired on the user-designated date of distribution is recorded. Regarding the time of distribution, for example, any one time in 24 hour clock representation is designated. In the example in FIG. 3, "5" (o'clock) in the first row in the field 312 and "11" (o'clock) in the second row in the field 312 are recorded.

In the field 314, a layout No. for specifying the output layout of digital content is recorded. Regarding the layout No., for example, a layout No. for specifying an output layout desired by the user is designated. In the example in FIG. 3, "LAYOUT No. 2" in the first row in the field 314 and "LAYOUT No. 5" in the second row in the field 314 are recorded. The layout No. is described in greater detail below.

In the field 316, a maximum number of pages which is an upper limit used when digital content is displayed or printed is recorded. Regarding the maximum number of pages, for example, a maximum number of pages which is used as an upper limit is designated, or by using a representation of "u", it is designated that the upper limit is not set. In the example in FIG. 3, two pages in the first row in the field 316 and "u" in the third row in the field 316 are recorded.

In the field 318, a font size for displaying or printing digital content is recorded. In the example in FIG. 3, "SMALL" in the first row in the field 318 and "NORMAL" in the third row in the field 318 are recorded.

In the field 320, other-user-unique information that is information unique to a user, excluding the information recorded in the fields 302 to 318, is recorded. For example, the age, sex, interest/preference, address, and name of the user, or user-terminal-related operating environments are input as the other-user-unique information. The user-terminal-related operating environments include, for example, the specifications of the user terminal 200, an application installed into the user terminal 200, the specifications of peripheral devices (e.g., a printer) connected to the user terminal 200, and the network environments (e.g., communication speed) of the user terminal 200.

In the field 322, other-user-designated information that is information designated by the user, excluding the information recorded in the fields 302 to 320, is recorded. Regarding the other-user-designated information, for example, data size and data receiving time in the case of receiving distributed digital content, digital content quality (color or monochrome, or DPI of digital content, etc.), a ratio of character information to images, the type (a photograph only, an advertisement, a list of recommended articles, etc.) of information which is disposed in a free area obtained by arranging the digital content, the types and colors of fonts, and character spacing and line pitch, or print paper size and a maximum number of pages are designated.

Figure 4:
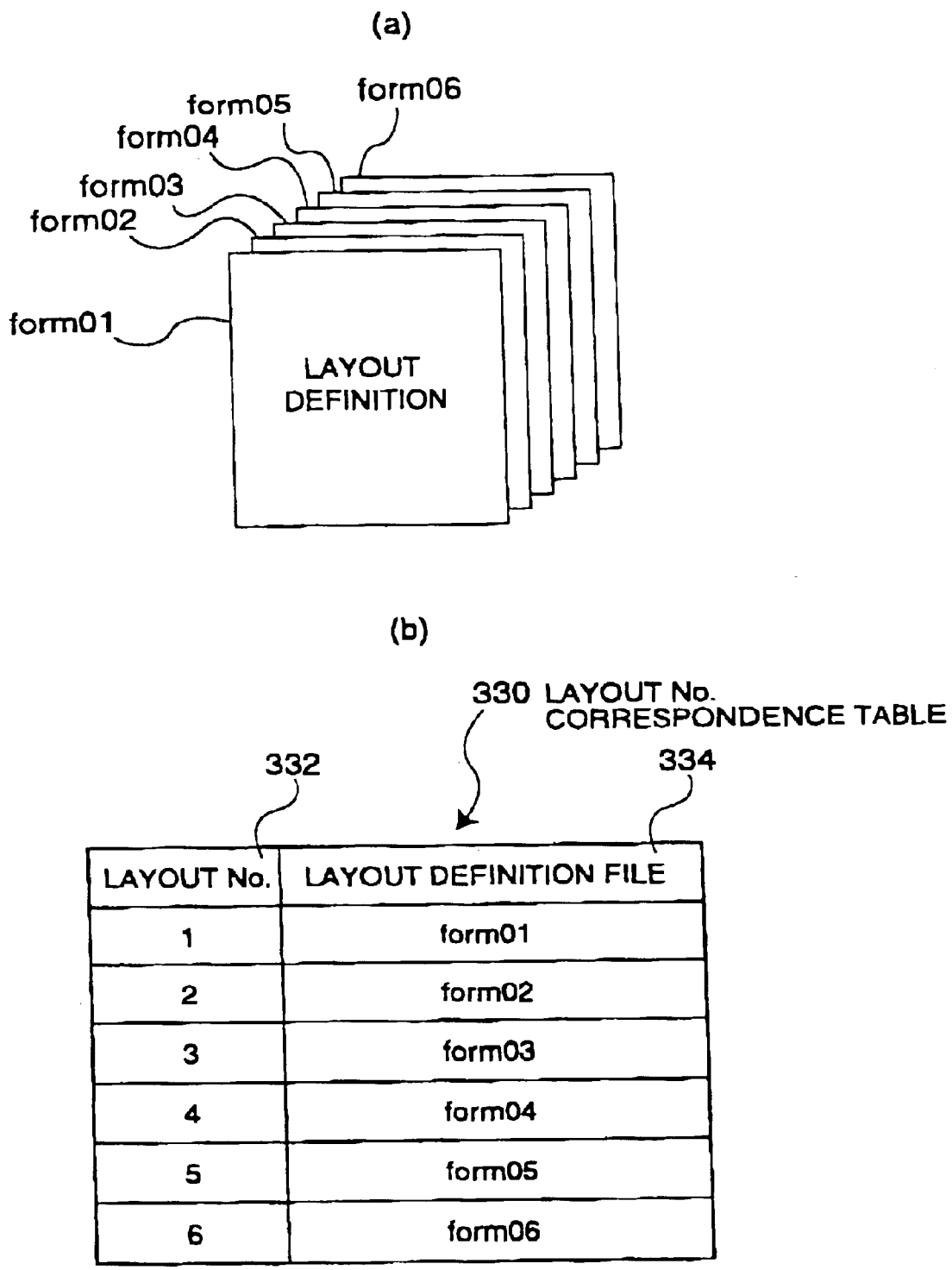
FIG. 4 is a drawing showing layout definition files and the data structure of a layout No. correspondence table 330.

In the user information record DB 40, a plurality of layout definition files form01 to form06 that define the output layout of digital content, a layout No. correspondence table 330 that indicates correspondences between the layout definition files form01 to form06 and layout Nos. are stored, as shown in FIG. 4. FIG. 4 is a drawing showing the layout definition files and the data structure of a layout No. correspondence table 330.

The layout definition files form01 to form06 define, for example, a character information frame for storing the character information, the sizes of images included in the digital content, positions at which the images are arranged in a print paper area, the sizes, types, and colors of the fonts of the character information, character spacing, line pitch, the number, quality, and size of each image, which are described in the XML (eXtensible Markup Language) or the like.

The layout No. correspondence table 330 includes a record for each layout No. Each record includes a field 332 in which a layout No. is recorded, and a field 334 in which the file name of a layout definition file is recorded. In the example in FIG. 4(b), the first row record contains "1" as a layout No. and "form01" as a layout definition file name. The second row record contains "2" as a layout No. and "form02" as a layout definition file name.

Figure 5:
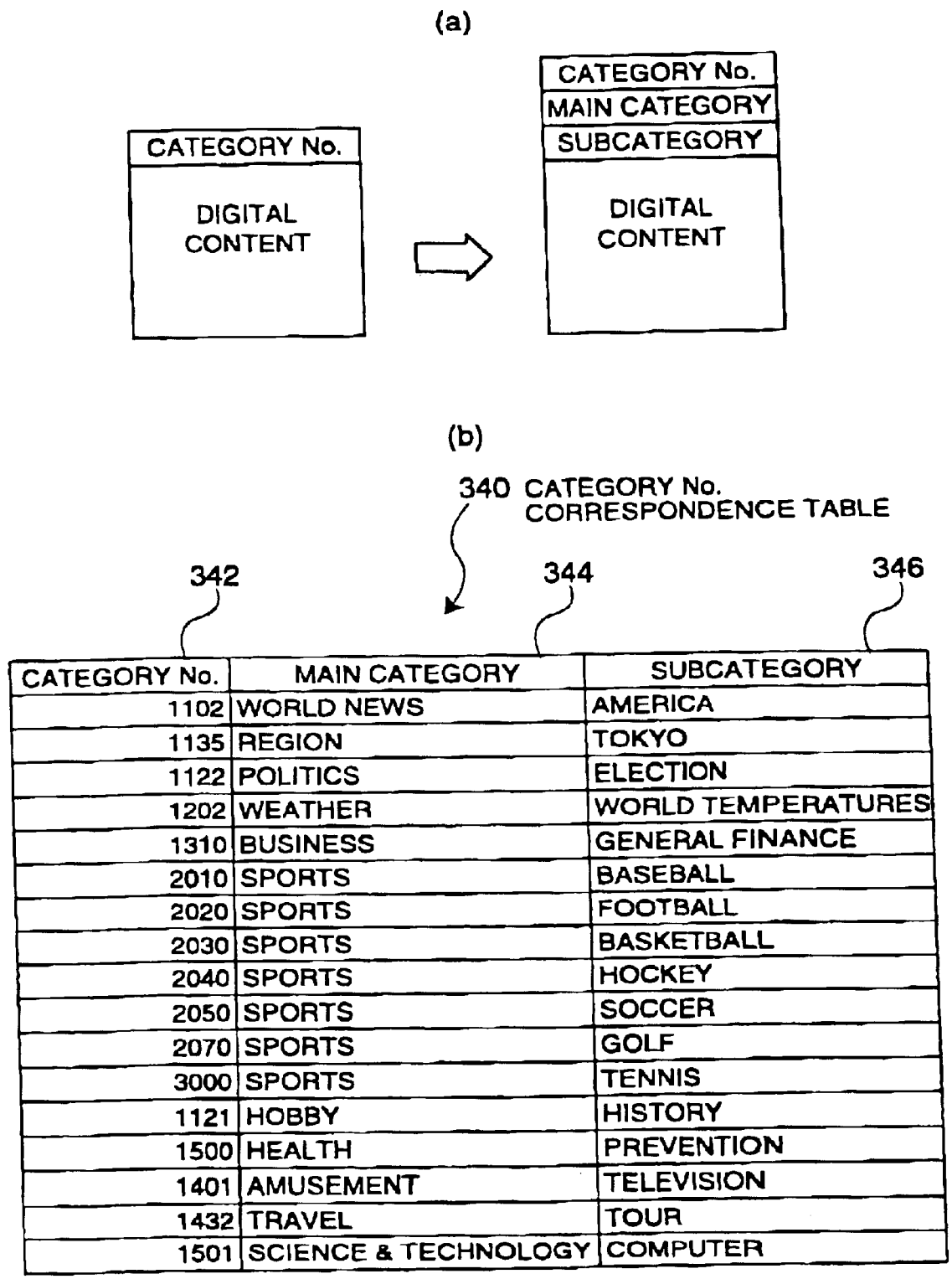
FIG. 5 is a drawing showing digital content and the data structure of a category No. correspondence table 340.

The content record DB 42 contains the digital content provided by the content providing terminals $S_l$ to $S_n$ and a category No. correspondence table 340 that indicates the correspondences of main categories and subcategories with category Nos., as shown in FIG. 5. FIG. 5 is a drawing showing digital content and the data structure of the category No. correspondence table 340.

Each piece of digital content provided by the content providing terminals $S_1$ to $S_n$ can include an added category No., as shown in FIG. 5(a). Based on the category No., the digital content is classified into categories and is recorded in the content record DB 42. When recording, each piece of the digital content is recorded after a main category and a subcategory are added to the piece by referring to the category No. correspondence table 340.

The category No. correspondence table 340 can include a record for each main category and each subcategory, as shown in FIG. 5(b). Each record includes a field 334 in which a category No. is recorded, a field 344 in which a main category is recorded, and a field 346 in which a subcategory is recorded. In the example in FIG. 5(b), the first row record contains "1102" as a category No., "WORLD NEWS" as a main category, and "AMERICA" as a subcategory. The sixth row record contains "2010" as a category No., "SPORTS" as a main category, and "BASEBALL" as a subcategory.

Next, the structure of the CPU 30 and processing executed by the CPU 30 are described with reference to FIG. 6 and FIG. 7.

Figure 6:
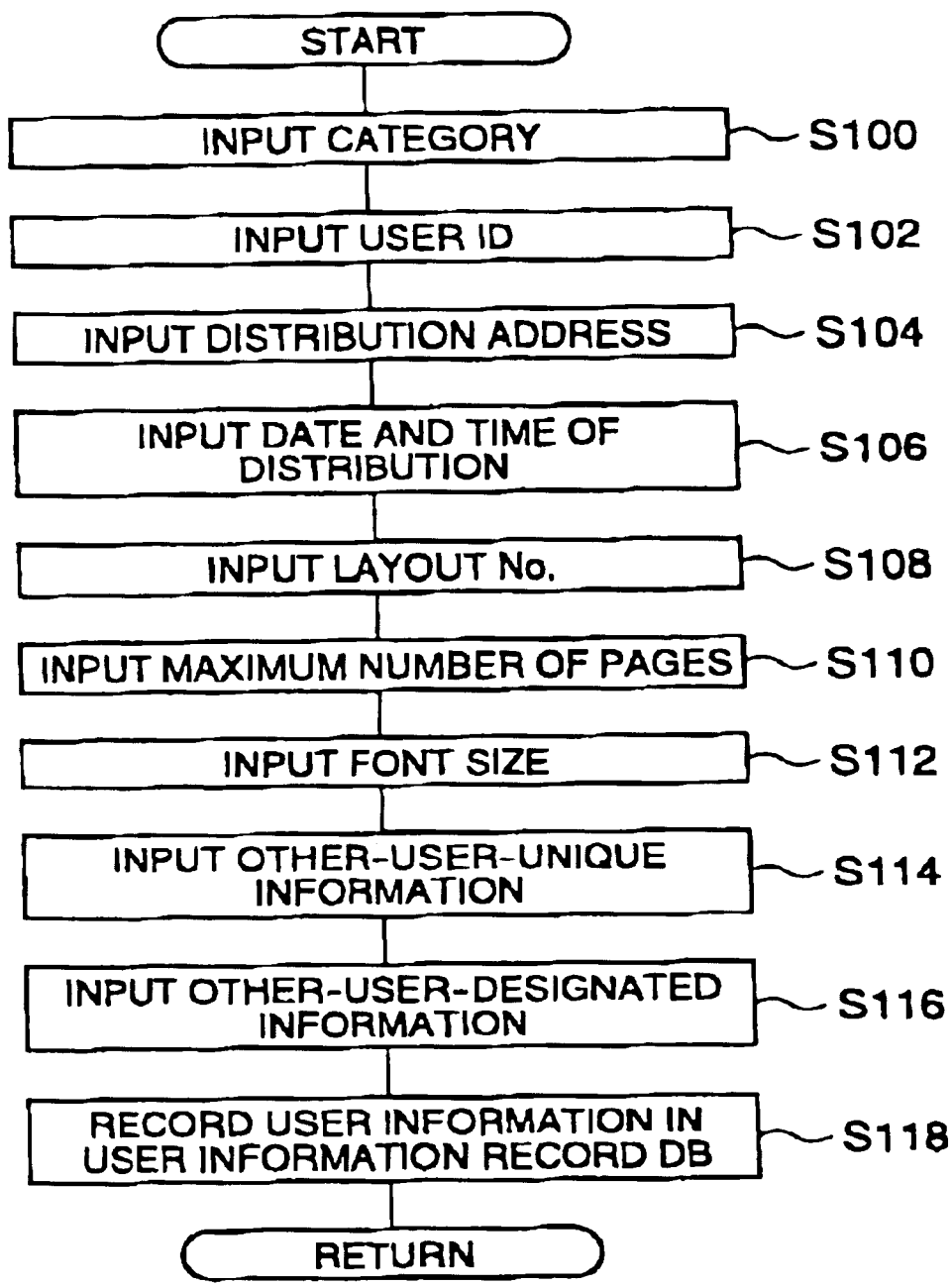
FIG. 6 is a flowchart showing a user recording process.
Figure 7:
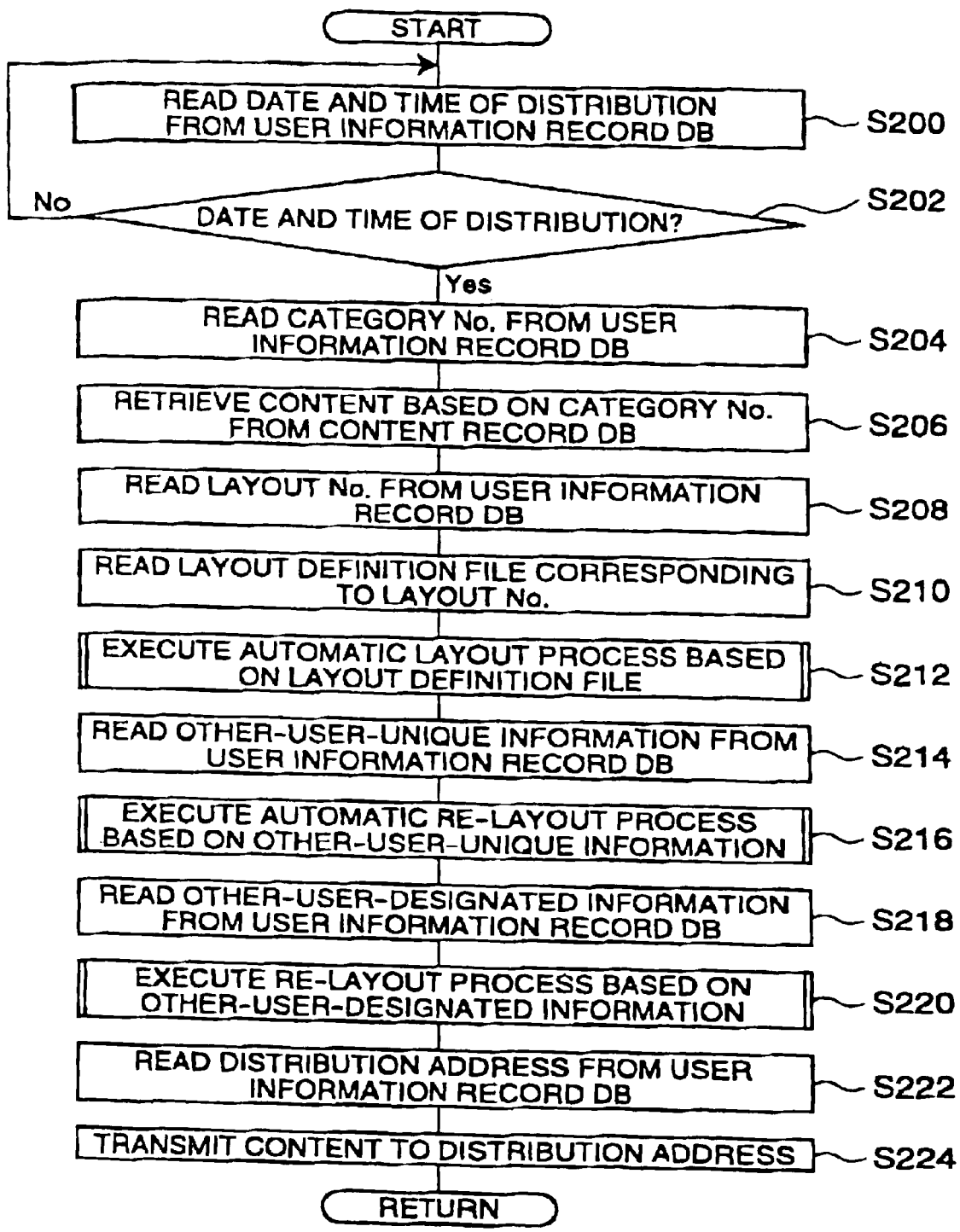
FIG. 7 is a flowchart showing a content distribution process.

The CPU 30 is made of a micro-processing unit MPU or the like, can start a predetermined program stored in a predetermined area of the ROM 32, and can time-divisionally execute, in accordance with the program, a user recording process and a content distribution process which are shown in the flowcharts of FIG. 6 and FIG. 7.

First, the user recording process is described with reference to FIG. 6. FIG. 6 is a flowchart showing the user recording process.

The user recording process is a process which requests a user who performs accessing to input necessary user information such as a user ID and which records the input user information in the user profile table 300. When it is executed by the CPU 30, it proceeds to step S100 at first, as shown in FIG. 6. Inputting in each step is entirely performed by interactive communication with the user.

In step S100, a main category and a subcategory are input. Proceeding to step S102, a user ID is input. Proceeding to step S104, a distribution address is input. Proceeding to step S106, a date of distribution and a time of distribution are input before proceeding to step S108.

In step S108, a layout No. is input. Proceeding to step S110, the maximum number of pages is input. Proceeding to step S112, font size is input. Proceeding to step S114, other-user-unique information is input. Proceeding to step S116, other-user-designated information is input. Proceeding to S118, the user information input in steps S100 to S116 is record in the user profile table 300. The sequential process is terminated before returning to the original processing.

Next, the content distribution process is described with reference to FIG. 7. FIG. 7 is a flowchart showing an exemplary content distribution process.

The content distribution process is a process that distributes digital content to the user terminal 200 by referring to the user profile table 300. When the content distribution process is executed by the CPU 30, it proceeds to step S200, as shown in FIG. 7. Processing in each of the following steps is performed for one record of the user profile table 300. Actually, the processing in the steps is executed a number of times which is the number of records contained in the user profile table 300.

In step S200, a date of distribution and a time of distribution are read from the user profile table 300. Proceeding to step S202, the process determines, based on the read date of distribution and the time of distribution, whether or not the digital content should be distributed. If the process has determined that the digital content should be distributed (Yes), it proceeds to step S204. If the process has determined otherwise, it proceeds to step S200.

In step S204, a category No. is read from the user profile table 300. Proceeding to Step S206, the read category No. is used to search digital content in the content record DB 42. Digital content to which a category No. corresponding to the read category No. is added is retrieved, and the process proceeds to step S208.

In step S208, a layout No. is read from the user profile table 300. Proceeding to step S210, by referring to the layout No. correspondence table 330, a layout definition file corresponding to the read layout No. is read from the user information record DB 40. Proceeding to step S212, an automatic layout process is executed which creates digital content by determining, based on the read layout definition file, an output layout for the digital content retrieved in step S206, and the distribution process proceeds to step S214.

In step S214, other-user-unique information is read from the user profile table 300. Proceeding to step S216, an automatic re-layout process is executed which creates digital content by redetermining, based on the read other-user-unique information, an output layout for the digital content created in step S212, and the distribution process proceeds to step S218.

In step S216, when the other-user-unique information is specifically the age of the user, for example, when the user is a relatively elder person, a layout having a relatively large font is employed. When the user is a child, a child-oriented layout (use of many colors for font, etc.) is employed.

When the other-user-unique information is the sex of the user, or is female and young, for example, a layout having a round character font is employed, and a layout in which a character information frame and images are rounded is employed.

In a case in which the other-user-unique information is interest/preference of the user, when the user is interested in sports, a layout looking like a sports newspaper is employed. When the user is interested in technology, a layout looking like a technical document is employed. When the user is interested in things for children, a layout looking like a magazine for children is employed. When laying out digital content that greatly matches the user's interest/preference, a layout that is easy to view can be formed, for example, by enlarging an image (photograph) and enlarging font size, or changing the color of a font to a color different from that of other digital content. In other words, regarding digital content that greatly matches the user's interest/preference, the importance of its layout can be enhanced.

When the other-user-unique information is a user's address, a layout is employed in which the image of a landscape associated with a place having the address is used as a background. For example, in a season in which cherry trees come in blossom in the place having the user's address, the image of a cherry-tree landscape is used as a background.

When the other-user-unique information is the name of the user, a layout including the name as the title of digital content is employed. For example, when the name of the user is Yamada, the title "Yamada Times" is given.

In a case in which the other-user-unique information is user-terminal-related operating environments, when the RAM of the user terminal 200 has a smaller capacity, a layout in which an image having a large amount of data is not used as much as possible is employed. When a printer connected to the user terminal 200 is a laser printer, a layout in which the Ming type of fine lines is used as a font is employed since relatively beautiful fine lines must be printed. When the network environment of the user terminal 200 has a small communication speed, a layout in which the data amount of digital content is reduced by reducing image quantity and quality is employed. Conversely, when the communication speed is large, a layout in which image quantity and quality are increased is employed.

In addition, in step S216, by arranging, in the print paper area, images which are included in the character information frame and the digital content so that they cannot overlap mutually, and storing, in the character information frame, character information which is included in the digital content, digital content is created. At this time, in the determination of the output layout, there are cases: one is that the number of characters of the character information that forms one article in the digital content is greater than the number of storable characters in the character information frame; and the other is that the number of characters of the character information that forms one article is less than the number of storable characters in the character information frame. Accordingly, layout is necessary for each case.

When the number of characters of the character information that forms one article in the digital content is greater than the number of storable characters in the character information frame, the following layout is performed.

First, the part of the character information which is greater than the number of storable characters is stored in another character information frame, and guidance information for referring to the excess part is stored in the character information frame which contains the part of the character information which is less than the number of storable characters. For example, the message "Continued on page 2" is stored as the guidance information. Also in the other character information frame, for example, the message "Continued from page 1" can be stored.

Second, the part of the character information which is greater than the number of storable characters is deleted, and guidance information indicating that the excess part has been deleted is stored in the character information frame containing the part of the character information which is less than the number of storable characters. A sign (mark of omission) indicating the deletion and the message "The rest is omitted", the URL (Universal Resource Locater) of each terminal in which the deleted part article is stored among the URLs of the content distribution terminal 100 and the content providing terminals $S_l$ to $S_n$, an article number for referring to the deleted part article by the content distribution terminal 100 or the content providing terminals $S_l$ to $S_n$, a barcode indicating the article number, or a password for accessing the article information of the deleted part by the content distribution terminal 100 or the content providing terminals $S_l$ to $S_n$ is stored as the guidance information.

Third, a word or a sentence which is included in the character information can be abbreviated, and the abbreviated character information is stored in the character information frame. In this case, in the user information record DB 40, an abbreviation record table containing abbreviations is stored in advance, which are obtained by omitting part of word forms, in a form in which they are associated with words or sentences composed of the word forms, and a word or a sentence which is included in the character information will be abbreviated by referring to the abbreviation record table.

Fourth, in order that the character information may be stored in the character information frame, the area of the character information frame is enlarged beyond a range in which the character information frame and each image do not overlap mutually. In this case, as a result of the enlargement of the character information frame, when the character information frame and the image overlap mutually, the color of characters in the overlapping part of the character information frame is determined based on the color of the overlapping part of the image. For example, if the color of the overlapping part of the image is black, the overlapping part of the character information frame is set to white.

The first to fourth processes may be selectively executed by an arbitrary or predetermined rule in the processing of step S216, or may be executed based on user's selection.

Next, when the number of characters of the character information that forms one article in the digital content is less than the number of storable characters in the character information frame, the following layout is performed.

First, the character information frame is reduced in size, and a free area in the print paper area which is obtained by the reduction, other digital content, an advertisement, and other information (hereinafter referred to as digital content, etc.) are arranged. In this case, digital content, etc., which fits the free area is selected.

Second, conversely to the first case, digital content, etc., to be added is selected first, and re-layout is performed so that digital content to be arranged and the digital content, etc., to be added can be arranged within the print paper area.

Third, in the first case, when a free area still remains after arranging the digital content, etc., other digital content, etc., is rearranged in the free area. In this case, digital content, etc., which fits the free area is selected.

In step S218, other-user-designated information is read from the user profile table 300. Proceeding to step S220, an automatic re-layout process is executed which creates digital content by redetermining, based on the read other-user-designated information, an output layout for the digital content created in step S212, and the distribution process proceeds to step S222.

In step S220, when the other-user-designated information includes specifically data size and data receiving time in the case of receiving the distributed digital content, and if it is designated by the user, image, character information, a maximum number of pages, etc., are determined so that the data size and data receiving time can be obtained. If this changes the image, then the character information, or the maximum number of pages, re-layout can be performed.

When the other-user-designated information includes the quality of digital content, and if it is designated by the user, image quality is determined so that such quality can be obtained.

When the other-user-designated information includes a ratio of character information to images, and if it is designated by the user, images are selected so that such a ratio can be obtained.

When the other-user-designated information includes the type of information that is arranged in the free area obtained by arranging the digital content, and if it is designated by the user, digital content, etc., is selected so that digital content, etc., of the designated type can be inserted.

When the other-user-designated information includes font type and color, and if it is designated by the user, font type and color are determined so that the font can be obtained.

When the other-user-designated information includes character spacing and line pitch, and if it is designated by the user, a layout in the character information frame is determined.

When the other-user-designated information includes a print paper size, and if it is designated by the user, then such a print paper size is employed, and an output layout is determined. Also, the other-user-designated information includes the maximum number of pages, and if it is designated by the user, the output layout is determined so that the designated maximum number pages can be obtained.

Also in step S220, in the determination of the output layout, there are cases: one is that the number of characters of the character information forming one article in the digital content is more than the number of storable characters in the character information frame; and the other is that the number of characters of the character information forming one article is less than the number of storable characters in the character information frame. In accordance with each case, layout needs to be performed, which is similar to the above step S216.

In step S222, a distribution address is read from the user profile table 300. Proceeding to step S224, the created digital content is distributed to the read distribution address. The sequential process is terminated before returning to the original processing.

Next, the operation of the first embodiment is described with reference to FIG. 8 to FIG. 11.

First, the case of recording the information required for distributing the digital content is described.

When hoping for the distribution of the digital content, the user uses a WWW browser in the user terminal 200 to access the content distribution terminal 100, and inputs a user recording request.

When the user recording request is input to the user terminal 200, screen forming data that forms a category designating screen for designating the category of digital content is received by communicating with the content distribution terminal 100, and the screen shown in FIG. 8 is displayed based on the screen forming data. FIG. 8 is a drawing showing the category designating screen.

At this time, the user is allowed to designate up to six categories of digital content that the user desires the distribution thereof. The designation of the categories of the digital content is performed by selecting desired categories from among combo boxes 320 to 325. On completing the designation of the categories, the user clicks on a button 326 for the item "DETERMINE".

When the designation of the categories is completed, the user terminal 200 transmits the designated categories to the content distribution terminal 100. Next, screen forming data which forms a user-ID-and-others input screen for inputting a user ID, etc., is received by communicating with the content distribution terminal 100, and the screen shown in FIG. 9 is displayed on the screen forming data. FIG. 9 is a drawing showing the user-ID-and-others input screen.

Here, as shown in FIG. 9, the user inputs each of a user ID, a password, a distribution address to which the user desires distribution, a date of distribution, and a time of distribution. The distribution address, the user ID, and the password are input, for example, by inputting numerals and a string of characters to text boxes 330 to 332 from a keyboard or the like. The date of distribution is input, for example, by selecting any of option buttons 340 to 343 for the items, "EVERYDAY", "EVERY WEEK", "WEEKDAYS" (MONDAY THROUGH FRIDAY), and "WEEKEND" (SATURDAY, SUNDAY). The time of distribution is input, for example, by selecting a desired time from combo boxes 350 and 351 in which times of distribution are recorded as a list. On completing the inputting, the user clicks on a button 352 for the item "DETERMINE".

Figure 10:
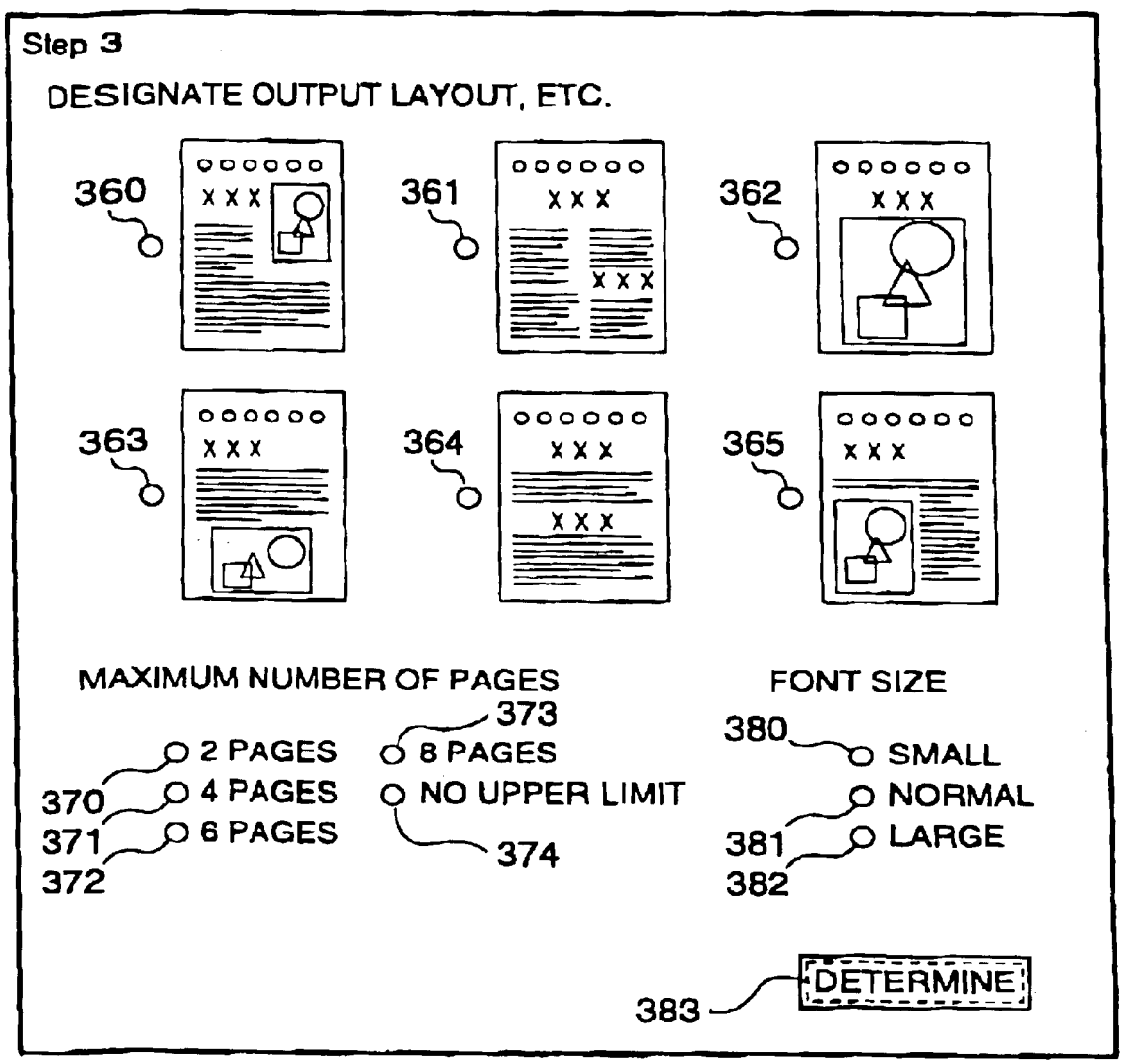
FIG. 10 is a drawing showing a screen for designating an output layout, etc.

When the inputting of the user ID, etc., is completed, the user terminal 200 transmits the user ID, etc., to the content distribution terminal 100. Next, a screen forming data for forming an output-layout-and-others designating screen for designating the output layout of digital content is received by communicating with the content distribution terminal 100, and the screen shown in FIG. 10 is displayed based on the screen forming data. FIG. 10 is a drawing showing the output-layout-and-others designating screen.

Here, the user designates each of a layout No., a maximum number of pages, and font size, as shown in FIG. 10. The designation of the layout No. is performed, for example, by selecting any of six option buttons 360 to 365 corresponding to sample images having layouts formed by output layouts. The designation of the maximum number of pages is performed, for example, by selecting any of option buttons 370 to 374 for the items, "2 PAGES", "4 PAGES", "6 PAGES", "8 PAGES", and "NO UPPER LIMIT". The designation of the font size is performed, for example, by selecting any of option buttons 380 to 382 for the items, "SMALL", "NORMAL", and "LARGE". On finishing designating the items, the user clicks on a button 383 for the item "DETERMINE".

When the designation of the output layout, etc., is completed, the user terminal 200 transmits the designated output layout, etc., to the content distribution terminal 100. Next, a screen forming data for forming a user-unique-information input screen for inputting other-user-unique information is received by communicating with the content distribution terminal 100, and the user-unique-information input screen is displayed on the screen forming data.

Here, the user inputs the age, sex, interest/preference, address, and name of the user, or user-terminal-related operating environments similarly to the manner shown in FIG. 8 to FIG. 10, if required. The other-user-unique information is input, for example, by inputting each piece of information to the text box corresponding to each item.

When the user finishes inputting the other-user-unique information, the user terminal 200 transmits the other-user-unique information to the content distribution terminal 100. Next, a screen forming data for forming a user-designated-information-input screen for inputting other-user-designated information is received by communicating with the content distribution terminal 100, and the user-designated-information-input screen is displayed based on the screen forming data.

Here, similarly to the manner shown in FIG. 8 to FIG. 10, the user designates a data size and data receiving time in the case of receiving distributed digital content, the quality of digital content, a ratio of character information to images, the type of information to be arranged in a free area obtained by arranging digital content, font type and color, or character spacing and line pitch, if required. The other-user-designated information is input, for example, by inputting each piece of information to the text box corresponding to each item.

Figure 11:
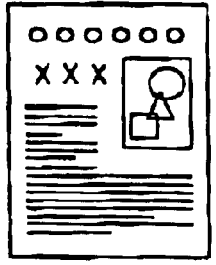
FIG. 11 is a drawing showing a recorded detail confirmation screen.

When the user finishes inputting the other-user-designated information, the user terminal 200 transmits the other-user-designated information to the content distribution terminal 100. Next, a screen forming data for forming a recorded-detail confirmation screen for confirming recorded details is received by communicating with the content distribution terminal 100, and the screen shown in FIG. 11 is displayed based on the screen forming data. FIG. 11 is a drawing showing an exemplary recorded-detail confirmation screen.

The example in FIG. 11 shows "SPORTS; GOLF; MARUYAMA" and "AMERICA; AMERICA TOP NEWS;

BUSH" as designated categories, "EVERYDAY" and "5:00 AM" as date and time of distribution, and "Tanaka.Toshio3@exe.aaaa.co jp" as a distribution address. It also shows a sample image as an output layout which has a layout formed by an output layout, "4 PAGES" as a maximum number of pages, and "SMALL" as a font size. When no error is found in the recorded details, the user clicks on an item 390 for the item "START DISTRIBUTION".

When the user finishes confirming the recorded details, the user terminal 200 transmits a distribution start request to the content distribution terminal 100.

When receiving the distribution start request, in step S114 and thereafter, the content distribution terminal 100 records, in the user profile table 300, the designated content, the user ID, etc., the designated output layout, etc., the other-user-unique information, and the other-user-designated information which have already been received. At this time, the designated content is recorded as a content No. by referring to the content No. correspondence table 340, and the designated output layout is recorded as a layout No. by referring to the layout No. correspondence table 330.

Next, the case of distributing digital content by referring to the user profile table 330 is described.

When the content distribution terminal 100 finds, by referring to the user profile table 300, that it is time to distribute the digital content, in steps S204 and S206, a category No. is read from the user profile table 300, the read category No. is used to search digital content in the content record DB 42, and digital content to which a category No. matching the read category No. is added is retrieved. Next, in steps S208 to S212, a layout No. is read from the user profile table 300, and by referring to the layout No. correspondence table 330, a layout definition file corresponding to the read layout No. is read from the user information record DB 40. Based on the read layout definition file, an output layout is determined for the retrieved digital content, and digital content is created.

Subsequently, in steps S214 and S216, other-user-unique information is read from the user profile table 300. Based on the read other-user-unique information, an output layout is redetermined for the created digital content, whereby digital content is created.

After that, in steps S218 and S220, other-user-designated information is read from the user profile table 300. Based on the read other-user-designated information, an output layout is redetermined for the created digital content, whereby digital content is created.

In steps S222 and S224, a distribution address is read from the user profile table 300, the created digital content is distributed to the read distribution address.

In this manner, in this embodiment, the content distribution terminal 100 creates digital content by determining a digital-content output layout based on other-user-unique information and other-user-designated information.

This makes it possible to output digital content in an output layout which relatively matches user's desire because user-unique information and user-designated information are considered concerning an output layout. Thus, digital content can be output in an output layout that is easy to view for the user.

In particular, printing on paper is performed in units of pages, for example, because a print layout is determined in this embodiment. Thus, by employing a layout in which its content is complete for each page, only desired pages can be printed, while viewing each of the pages which is displayed on the screen. In addition, if a date is inserted into each page in the layout, even in the case of storing digital content as a file, the user feels convenience since the user can recognize each article by viewing its date.

In addition, in this embodiment, when the number of characters of character information forming one article in the digital content is greater than the number of storable characters in the character information frame, the content distribution terminal 100 can store, in another character information frame, the part of the character information which is greater than the number of storable characters, and the content distribution terminal 100 can store, in the character information frame containing the part of the character information which is less than the number of storable characters, guidance information for referring to the excess part.

This enables an output layout that is relatively easy to view because character spacing and character pitch are not changed even when the number of characters of character information forming one article in the digital content is greater than the number of storable characters in the character information frame. The user can understand how the character information correspond by referring to the guidance information.

Moreover, in this embodiment, when the number of characters of character information that forms one article in the digital content is greater than the number of storable characters in the character information frame, the content distribution terminal 100 can delete the part of the character information which is greater than the number of storable characters, and the content distribution terminal 100 can store, in the character information frame containing the part of the character information which is less than the number of storable characters, guidance information indicating that the excess part has already been deleted.

This enables an output layout that is relatively easy to view because character spacing and character pitch are not changed even when the number of characters of character information forming one article in the digital content is greater than the number of storable characters in the character information frame. The user can view the deleted part of the character information by referring to the guidance information.

In this embodiment, when the number of characters of character information that forms one article in the digital content is greater than the number of storable characters in the character information frame, the content distribution terminal 100 is designed so that a word or a sentence which is included in the character information will be abbreviated, and the abbreviated character information will be stored in the character information frame.

This enables an output layout that is relatively easy to view because character spacing and character pitch are not changed even when the number of characters of character information forming one article in the digital content is greater than the number of storable characters in the character information frame.

In this embodiment, when the number of characters of character information that forms one article in the digital content is greater than the number of storable characters in the character information frame, the content distribution terminal 100 can enlarge the area of the character information frame beyond a range in which the character information frame and images do not overlap mutually in order that the character information may be stored in the character information frame.

This enables an output layout that is easier to view because character spacing and character pitch are not changed even when the number of characters of character information forming one article in the digital content is greater than the number of storable characters in the character information frame.

In this embodiment, when the character information frame and the images overlap mutually as a result of enlarging the character information frame, the content distribution terminal 100 can determine, based on the color of the overlapping part of the images, the color of characters in the overlapping part of the character information frame.

Even when the character information frame and the image overlap mutually, characters in the overlapping part of the character information frame can be set recognizable in such a way that, for example, if the color of the overlapping part of the image is black, the color of the overlapping part of the character information frame is set white.

In this embodiment, the content distribution terminal 100 can execute, based on user's selection, layout processing for a case in which the number of characters of character information that forms one article in the digital content is greater than the number of storable characters in the character information frame.

This makes it possible to output digital content in an output layout that more matches user's desire. Thus, digital content can be output in an output layout that is easier to view for the user.

In this embodiment, when the number of characters of the character information forming one article is less than the number of storable characters in the character information frame, the content distribution terminal 100 can arrange, after reducing the character information frame in size, other digital content, etc., in a free area of an output area which is obtained by the reduction.

This enables an output layout that is relatively easy to view because character spacing and character pitch are not changed even when the number of characters of character information that forms one article in the digital content is greater than the number of storable characters in the character information frame. Of the output area, in the free area that isformed by the reduction, other digital content, an advertisement, and other information are arranged, so that the digital content is not emptied.

In this embodiment, based on the degree of matching with interest/preference of the user, the output layout of digital content can be determined. This makes it possible to form a layout having digital content that the user desires the distribution thereof is emphasized. Thus, an output layout that is relatively easy to view for the user can be formed.

In this embodiment, based on other-user-unique information and other-user-designated information in the user information record DB 40, the content distribution terminal 100 can create digital content after determining a digital-content output layout, and can distribute the created digital content, based on the distribution address of the user information used for the creation. This makes it possible to output digital content in an output layout that relatively matches with user's desire since user-unique information and user-designated information are considered concerning the output layout. Thus, digital content can be output in an output layout that is easier to view for the user than conventional layouts.

Figure 12:
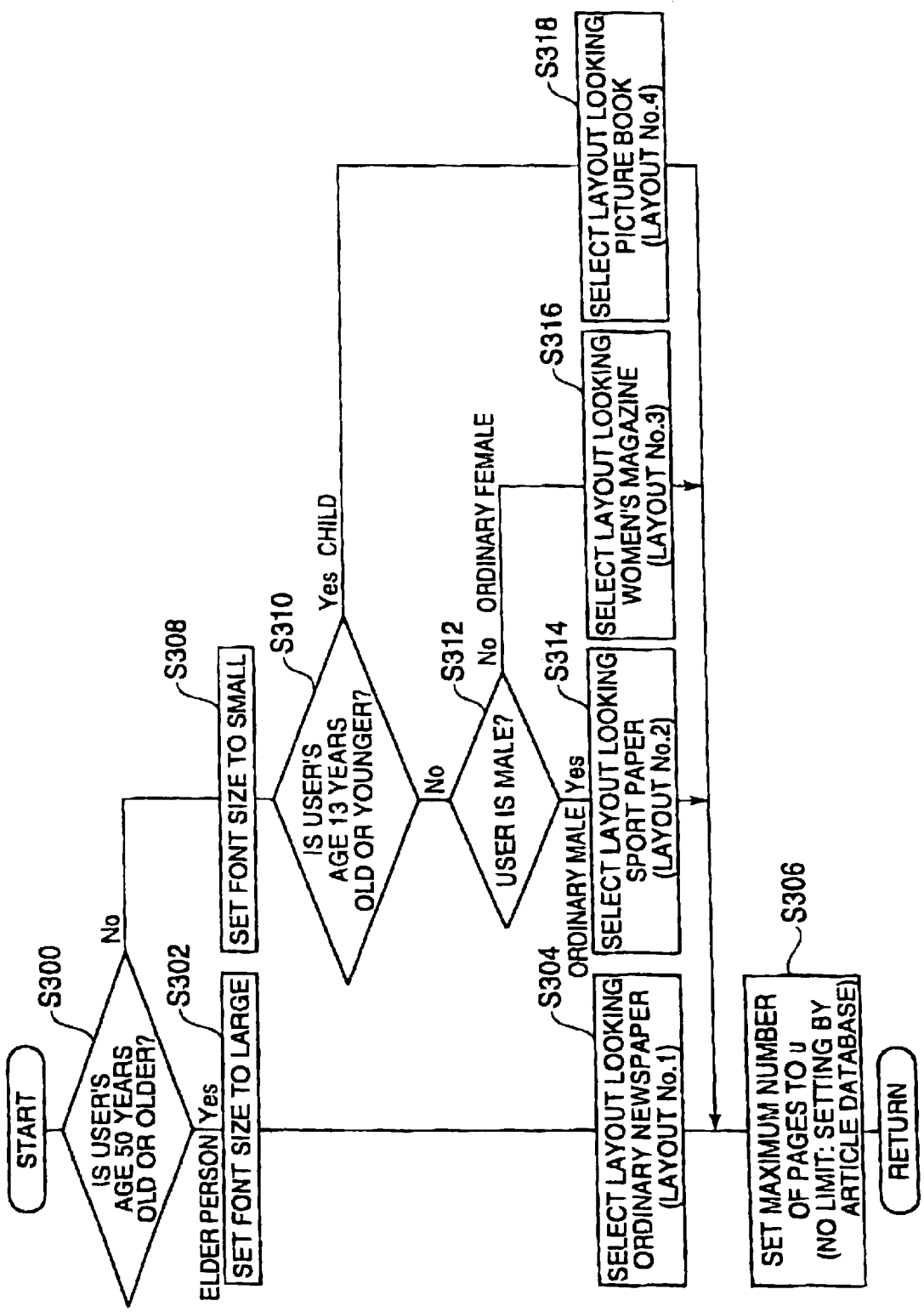
FIG. 12 is a flowchart showing a layout automatic selection process.

Next, a second embodiment of the present invention is described with reference to the drawings. FIG. 12 is a drawing showing the second embodiment of the present invention concerning a viewable information creating system, a digital content creating system, a digital content distribution system, and a digital content creating program.

In the embodiment, the viewable information creating system, the digital content creating system, the digital content distribution system, and the digital content creating program which are in accordance with the present invention are applied to a case in which, as shown in FIG. 1, the content distribution terminal 100 distributes digital content such as news to the user terminal 200. The embodiment differs from the first embodiment in that the designation of a layout is not performed by the user but is automatically performed based on other-user-unique information.

Portions different from those in the first embodiment are only described below, and identical portions are denoted by identical reference numerals for omitting description.

The user information record DB 40 contains a layout definition file for defining a layout looking like a general newspaper, a layout definition file for defining a layout looking like a sports newspaper, a layout definition file for defining a layout looking like a women's magazine, and a layout definition file for defining a layout looking like a picture book as, for example, layout definition files form01 to form04, respectively. Here, the general newspaper style, the sports newspaper style, the women's magazine style, and the picture book style are represented by differences in layout components such as page (paper) size, the arrangement and size of content such as a title and articles, font type and size, colors in use, use of a background image.

Instead of processing in steps S108 to S112 in the first embodiment, the CPU 30 can execute the layout automatic selection process shown in the flowchart of FIG. 12 after step S116. FIG. 12 is a flowchart showing the layout automatic selection process.

When the layout automatic selection process is executed after the above step S116, it first proceeds to step S300, as shown in FIG. 12.

In step S300, based on the other-user-unique information input in step S114, it is determined whether or not the age of the user is relatively old (for example, fifty years old or older). When it is determined that the age of the user is relatively old (Yes), the process proceeds to step S302, and sets the font size to "LARGE" before proceeding to step S304.

In step S304, layout No. 1 corresponding to the layout definition file form01 is selected as one designating the general-newspaper-looking layout. Proceeding to step S306, the maximum number of pages is set to "u" (no limit), and the sequential process is terminated before returning to the original processing.

In step S300, when it is determined that the age of the user is not old (No), the process proceeds to step S308, and sets the font to "SMALL". Proceeding to step S310, it is determined, based on the other-user-unique information input in step S114, whether or not the age of the user is relatively young (for example, thirteen years old or older). When it is determined that the age of the user is not young (No), the process proceeds to step S312.

In step S312, it is determined, based on the other-user-unique information input in step S114, whether or not the user is male. When it is determined that the user is male (Yes), the process proceeds to step S314, and selects layout No. 2 corresponding to the layout definition file form02 as one designating the sports-newspaper-looking layout before proceeding to step S306.

When it is determined that the user is female (No), the process proceeds to step S316, and selects layout No. 3 corresponding to the layout definition file form03 as one designating the women's-magazine-looking layout before proceeding to step S306.

When it is determined in step S310 that the user is relatively young (Yes), the process proceeds to step S318, and selects layout No. 4 corresponding to the layout definition file form04 as one designating the picture-book-looking layout before proceeding to step S306.

Next, the operation of the above second embodiment is described.

In a case in which the user is relatively old, when recording the user information, in steps S300 to S306, the font size is set to "LARGE", layout No. 1 is selected, and the maximum number of pages is set to "u". Accordingly, when the digital content is distributed, digital content is created in the general-newspaper-looking layout in step S216 and thereafter.

In addition, in a case in which the user is neither old nor young and is male, when recording the user information, the font size is "SMALL", layout No. 2 is selected, and the maximum number of pages is "u" in steps S300, S308 to S314, and S306. Accordingly, when the digital content is distributed, the sports-newspaper-looking layout is created in step S216 and thereafter.

In a case in which the user is neither old nor young and is female, when recording the user information, the font size is set to "SMALL", layout No. 3 is selected, and the maximum number of pages is set to "u" in steps S300, S308 to S312, and S306. Accordingly, when the digital content is distributed, the digital content is created in the women's-magazine-looking layout in step S216 and thereafter.

In a case in which the user is relatively young, when recording the user information, in steps S300, S308, S310, S318, and S306, the font size is set to "SMALL", layout No. 4 is selected, and the maximum number of pages is set to "u". Accordingly, when the digital content is distributed, the digital content is created in the picture-book-looking layout in step S216 and thereafter.

In this manner, in the embodiment, based on the other-user-unique information and the other-user-designated information in the user information record DB 40, the content distribution terminal 100 determines a digital-content output layout and creates digital content.

This makes it possible to output digital content in an output layout that relatively matches with user's desire since user-unique information and user-designated information are considered concerning the output layout. Thus, digital content can be output in an output layout that is easier to view for the user than conventional layouts.

Although in the above first and second embodiments, the output layout of digital content is determined based on other-user-unique information and other-user-designated information, it should be understood that the output layout of the digital content may be determined not only based on both but also based on the number of images included in the digital content or the amount of character information included in the digital content.

This enables an output layout that is relatively easy to view, even if the number of images included in the digital content or the amount of character information included in the digital content is large, or is conversely small.

In this case, it is preferable to determine the output layout of the digital content, for example, based on the aspect ratio of each image included in the digital content.

This enables an output layout that is relatively easy to view, even if the aspect ratio of the image included in the digital content is large, or is conversely small. For example, the longitudinal length of an image is larger than the lateral length of the image, a A-4 size sheet of paper is longitudinally positioned for arranging characters and images. Conversely, when the lateral length of the image is larger than the longitudinal length of the image, the A-4 size sheet of paper is laterally positioned for arranging characters and images.

In the above second embodiment, the designation of a layout is automatically performed based on other-user-unique information. However, it should be understood that other constructions may be used in which by displaying an automatically created layout as an option in the upper part of on the display screen in FIG. 10, and setting the automatically created layout as a recommended value (default value), the user can also select another layout.

Although in the above first and second embodiments, the layout processes in steps S212, S216, and S220 are executed by the content distribution terminal 100, it should be understood that the layout processes may be executed not only by it but also by the user terminal 200. This can reduce a concentration of the processing load on the content distribution terminal 100.

Although in the above first and second embodiments, the user terminal 200 accesses the content distribution terminal 100 by using a WWW browser, it should be understood that it can also be accessed by using an application having a communication function capable of accessing the content distribution terminal 100, the accessing may be performed with such a particular application.

Although the above first and second embodiments uses a construction in which user-terminal-related operating environments are recorded by entry from the user, it should be understood that not only the construction but also a construction may be used in which the user-terminal-related operating environments are automatically examined and are recorded in the content distribution terminal 100 by the user terminal 200. For example, a communication speed as the network environment of the user terminal 200 may be measured by performing a connection test between the user terminal 200 and the content distribution terminal 100.

Although the above first embodiment describes a case in which a control program stored beforehand in the ROM 32 is executed for executing each of the processes shown in FIG. 6 and FIG. 7, it should be understood that not only that case but also a case is possible in which from a storage medium containing a program describing the process, the program may be executed after being loaded into the RAM 34.

Although the above second embodiment described a case in which a control program stored beforehand in the ROM 32 is executed for executing the process shown in the flowchart of FIG. 12, it should be understood that not only that case but also a case is possible in which from a storage medium containing a program describing the process, the program may be executed after being loaded into the RAM 34.

Here, the storage medium is a semiconductor storage medium such as a RAM or a ROM, a magnetic storage medium such as an FD or an HD, an optical reading storage medium such as a CD, a CDV, an LD, or a DVD, or a magnetic-storage/optical-reading storage medium such as an MO, and includes any storage medium if it is a computer-readable storage medium irrespective of the method of electronic, magnetic, optical, or other reading.

Although the above first and second embodiments describe a case in which the viewable information creating system, the digital content creating system, the digital content distribution system, and the digital content creating program that are in accordance with the present invention are applied to a network system composed of the Internet 199, it should be understood that they may also be applied not only to it but also to a so-called intranet that performs communication by using a method identical to that of the Internet 199. Of course, they may be applied not only to a network that performs communication by using a method identical to that of the Internet 199, but also to an ordinary network.

Although in the above first and second embodiments the viewable information creating system, the digital content creating system, the digital content distribution system, and the digital content creating program that are in accordance with the present invention are applied to a case in which, as shown in FIG. 1, the content distribution terminal 100 distributes digital content such as news to the user terminal 200, it should be understood that they may also be applied not only to the case, but also to other cases without departing from the spirit and scope of the present invention.

As described above, according to a viewable information creating system of the present invention, an advantage is obtained in that viewable information can be output in an output layout that is easier to view for the user than conventional layouts because viewable information can be output in an output layout that relatively matches with user's desire since user-unique information and user-designated information are considered concerning the output layout.

According to a digital content creating system of the present invention, an advantage is obtained in that digital content can be output in an output layout that is easier to view for the user than conventional layouts because digital content can be output in an output layout that relatively matches with user's desire since user-unique information and user-designated information are considered concerning the output layout.

According to a digital content creating system of the present invention, an advantage is also obtained in that an output layout that is relatively easy to view can be formed because character spacing and character pitch are not changed even when the number of characters of the character information forming one article in the digital content is greater than the number of storable characters in the character information frame. Also an advantage is obtained in that the user can understand how the character information corresponds by viewing guidance information.

According to a digital content creating system of the present invention, an advantage is also obtained in that an output layout that is relatively easy to view can be formed because character spacing and character pitch are not changed even when the number of characters of the character information forming one article in the digital content is greater than the number of storable characters in the character information frame. Also an advantage is obtained in that the user can view the deleted part of character information by referring to guidance information.

According to a digital content creating system of the present invention, an advantage is also obtained in that an output layout that is relatively easy to view can be formed because character spacing and character pitch are not changed even when the number of characters of the character information forming one article in the digital content is greater than the number of storable characters in the character information frame.

According to a digital content creating system of the present invention, an advantage is also obtained in that an output layout that is relatively easy to view can be formed because character spacing and character pitch are not changed even when the number of characters of the character information forming one article in the digital content is greater than the number of storable characters in the character information frame.

In addition, according to a digital content creating system of the present invention, an advantage is also obtained that, even when a character information frame overlaps with images, the characters of the overlapping part of the character information frame can be recognized.

According to a digital content creating system of the present invention, an advantage is also obtained in that an output layout that is relatively easy to view can be formed because digital content can be output in an output layout matching the user's desire.

According to a digital content creating system of the present invention, an advantage is also obtained in that an output layout that is relatively easy to view can be formed because character spacing and character pitch are not changed even when the number of characters of the character information forming one article in the digital content is greater than the number of storable characters in the character information frame. Also an advantage is obtained in that, in a free area formed by the reduction of an output area, other digital content, an advertisement, and other information are arranged, so that the digital content will not be empty.

According to a digital content creating system of the present invention, an advantage is obtained in that an output layout that is relatively easy to view can be formed, even when the number of images included in digital content or the amount of character information included in the digital content is large, or is conversely small.

According to a digital content creating system of the present invention, an advantage is obtained in that an output layout that is relatively easy to view can be formed, even when the aspect ratio of each image included in digital content is large, or is conversely small.

According to a digital content creating system of the present invention, an advantage is also obtained in that an output layout that is relatively easy to view can be formed because a layout is formed so that digital content that the user desires the distribution thereof is, for example, emphasized.

According to a digital content distribution system of the present invention, digital content can be output in an output layout which relatively matches user's desire because user unique information and user-designated information are considered concerning an output layout. Thus, digital content can be output in an output layout that is easier to view for the conventional layouts.

In addition, according to a digital content creating program of the present invention advantages equivalent to those in the above digital content creating system are obtained.

What is claimed is:

1. A system for creating digital content, comprising:
   a user information storage device that stores user information on each user;
   a content creating device that creates the digital content by determining, based on the user information in the user information storage device, an output layout for the digital content,
   said content creating device creating the digital content by arranging, in an output area, images which are included in a character information frame for storing character information and in the digital content so that the images cannot overlap mutually, and storing, in the character information frame, the character information which is included in the digital content; and when a number of characters of character information forming one document in the digital content is greater than a number of storable characters in the character information frame, said content creating device expands the area of the character information frame beyond a range in which the character information frame does not overlap with the images so that the character information can be stored in the character information frame.

2. A digital content creating system according to claim 1, when the character information frame overlaps with the images as a result of the expansion of the character information frame, said content creating device determines, based on the color of the overlapping part of the images, a color of characters in the overlapping part of the character information frame.

* * * * *